United States Patent [19]
Sugiyama

[11] Patent Number: 5,867,486
[45] Date of Patent: Feb. 2, 1999

[54] METHOD AND AN APPARATUS FOR UNKNOWN SYSTEM IDENTIFICATION

[75] Inventor: Akihiko Sugiyama, Tokyo, Japan

[73] Assignee: NEC Corporation, Tokyo, Japan

[21] Appl. No.: 741,814

[22] Filed: Oct. 31, 1996

[30]     Foreign Application Priority Data

Dec. 15, 1995   [JP]   Japan ................................. 7-327671

[51] Int. Cl.⁶ .............................. H04B 3/23; G06F 15/31
[52] U.S. Cl. ...................... 370/290; 379/411; 364/724.19
[58] Field of Search .................................. 370/282, 286, 370/290, 291; 379/406, 410, 411; 364/724.01, 724.16, 724.19, 724.2; 375/232

[56]               References Cited

U.S. PATENT DOCUMENTS

| | | | |
|---|---|---|---|
| 4,805,215 | 2/1989 | Miller ...................................... | 370/290 |
| 5,245,561 | 9/1993 | Sugiyama ............................ | 364/724.19 |
| 5,329,472 | 7/1994 | Sugiyama ............................ | 364/724.19 |
| 5,455,819 | 10/1995 | Sugiyama ................................ | 370/290 |
| 5,475,632 | 12/1995 | Sugiyama ............................ | 364/724.19 |
| 5,517,435 | 5/1996 | Sugiyama ................................ | 370/290 |
| 5,636,151 | 6/1997 | Ikeda .................................. | 364/724.19 |
| 5,657,349 | 8/1997 | Sugiyama ................................ | 375/232 |

OTHER PUBLICATIONS

B. Widrow, et al., "Adaptive Noise Cancelling: Principles and Applications", Proceedings of the IEEE, vol. 63, No. 12, Dec. 1975, pp. 1692–1716.

J.–I. Nagumo, et al., "A Learning Method for System Identification", IEEE Transactions on Automatic Control, Vol. AC–12, No. 3, Jun. 1967, pp. 282–287.

A. Sugiyama, et al., "A Fast Adaptive FIR Filter Algorithm With Reduced Computation For Adaptive TAP–Position Control", Proceedings of International Workshop on Intelligent Signal Processing and Communication Systems, IEEE, 1993, pp. 20–25.

*Primary Examiner*—Alpus H. Hsu
*Attorney, Agent, or Firm*—Ostrolenk, Faber, Gerb & Soffen, LLP

[57]               ABSTRACT

A method of and an apparatus for unknown system identification with an adaptive filter of effective and inactive taps is disclosed. An adaptive tap position control is executed by active tap number update and effects coefficient update by using a first step size till completion of a predetermined number of times of active tap number update and by using a second step size in a second state held after the completion of the predetermined number of times of active tap number update. The adaptive tap position control without counting the number of times of coefficient update is executed as active tap number update in the first state when the ratio of an input power supplied to the minimum absolute value coefficient tap to the total input power supplied to the active taps is less than a predetermined ratio.

20 Claims, 5 Drawing Sheets

METHOD AND AN APPARATUS FOR UNKNOWN SYSTEM IDENTIFICATION

BACKGROUND OF THE INVENTION

The present invention relates to a method of and an apparatus for identifying transmission lines, space acoustic coupling routes and other unknown systems.

The application of unknown system identification with an adaptive filter, echo cancelers, noise cancelers, hauling cancelers, adaptive equalizers and so forth are well known in the art. As an example of the prior art, an echo canceler will be described, which is inserted on the four-line side of a two-line/four-line converter for canceling the echo leaking from the transmitting circuit to the receiving circuit.

The echo canceler uses an adaptive filter, which has tap coefficients greater in number than the impulse response length of an echo path, and cancels echo leaking from the transmitting circuit to the receiving circuit on the four-line side of the two-line/four-line converter by generating a pseudo echo (or echo replica) corresponding to the transmitted signal. The tap coefficients of the adaptive filter are corrected by taking the correlation between an error signal, which is obtained by subtracting the echo replica from a mixed signal, which contains the echo and the received signal in a mixed fashion, and the transmitted signal. A typical coefficient correction algorithm of such adaptive filter is described in "LMS Algorithm", Proceedings of IEEE, Vol. 63, No. 12, 1975, pp. 1692–1716 (hereinafter referred to as "Literature 1"), and "Learning Identification Method; LIM", IEEE Transactions on Automatic Control", Vol. 12, No. 3, 1967, pp. 282–287 (hereinafter referred to as "Literature 2").

Where a fixed delay is present between the point on the four-line circuit, at which the echo canceler is inserted, and a certain point on the two-line/four-line circuit, the echo canceler should have taps which can sufficiently cover both the maximum estimated fixed delay and the significant part of the actual impulse response. Where the fixed delay is long, therefore, the taps are enormous in number and give rise to increase of the hardware and increase of the convergence time by mutual interference of coefficient.

To solve these problems, it has been proposed a method of adaptive tap coefficient location control of an adaptive filter such as to locate tap coefficients in the neighborhood of the significant part of the echo path impulse response, the position of which is estimated as described in "A Fast Adaptive FIR Filter Algorithm with Reduced Computation for Adaptive Tap-Position Control", Proceedings of International Workshop on Intelligent Signal Processing and Communication Systems, IEEE, 1993, pp. 20–25 (hereinafter referred to as "Literature 3"). In the method shown in "Literature 3", the converging time is reduced by estimating the approximate position of the significant part and locating the tap coefficients only in the neighborhood of the estimated position.

FIG. 4 is a block diagram showing the construction of the echo canceler proposed in "Literature 3". The adaptive filter shown in FIG. 4 has (N−1) delay elements $20_1$ to $20_{N-1}$ for delaying a transmission signal inputted from a transmission signal input terminal 1, and has a total of N taps including zero delay taps. To generate the tap coefficients of the adaptive filter, L (N>L) coefficient generators $30_1$ to $30_L$ are provided. More specifically, the adaptive filter shown in FIG. 4, unlike other prior art adaptive filters, has such number of tap coefficients as to be above to realize a substantial part excluding the fixed delay part, and generates the echo replica by adaptively locating the tap coefficients in the neighborhood of the substantial part. To generate the echo replica, a routing switch 7 is provided, which switches the connection between the outputs of the delay elements on one hand and the coefficient generators on the other hand. The route switch 7 is controlled by a tap controller 9, and its outputs are supplied as delayed signals to the corresponding coefficient generators $30_1$ to $30_L$ and also corresponding multipliers $40_2$ to $40_L$. The multipliers $40_1$ to $40_L$ multiply the tap coefficient values outputted by the coefficient generators $30_1$ to $30_L$ by the respective delay signals from the routing switch 7, and supply the resulting products to an adder 8. The adder 8 adds together the product outputs of the multipliers $40_1$ to $40_L$ and outputs the sum as the echo replica. The transmission signal inputted to the transmission signal input terminal 1 is sent out from a transmission signal output terminal 2 to a transmission line, and supplied by a two-line/four-line converter 3 thereon to the two-line side. However, due to impedance mismatch the transmission signal partly leaks as an echo to the receiving side. The echo that is inputted from a received signal input terminal 4 is supplied to a subtractor 5. The subtractor 5 subtracts the echo replica outputted from the adder 8 from the echo, and sends out the difference result to a received signal output terminal 6. The difference is also supplied as an error signal for coefficient update to the coefficient generators $30_1$ to $30_L$.

Assuming the LMS algorithm shown in "Literature 1" for the coefficient updating, the coefficient generator $30_i$ (i being $1, 2, \ldots, L$) can have a construction as shown in FIG. 5. The delayed signal and error signal supplied to the coefficient generator $30_i$ are multiplied by each other in a multiplier 31, and the product therefrom is multiplied by a step size output from a switch 78 in a multiplier 32. The output of the multiplier 32 represents a coefficient correction amount, and it is added in an adder 33 to a coefficient value stored in a memory 34 as the tap coefficient. The sum is fed back to the memory 34. When a coefficient clear signal is inputted from a coefficient clear circuit 77 to it, the memory 34 forcibly sets the stored coefficient value therein to zero. It will be seen from the above description that the tap coefficients of the adaptive filter are coupled to only some of the delay elements that are selected by the routing switch 7. Hereinafter, the taps with tap coefficients coupled thereto are called active taps, and those without any coupled tap coefficient are called inactive taps. In the actual tap coefficient adaptive location, tap coefficients which are less in number than the total number of taps are located as initial values at a uniform interval. The taps for which these tap coefficients are located are active taps, and those without any located tap coefficients are inactive taps.

Now, the tap controller 9 will be described. The adaptive filter shown in FIG. 4 may be in either one of two states, i.e., a "first state" and a "second state". State transition is brought about only from the "first state" to the "second state". Whenever the coefficient updating is executed, a maximum coefficient detector 81 receives the coefficient values outputted by the coefficient generators $30_1$ to $30_L$ and the active tap number supplied from a tap number calculator 76, and supplies the active tap number corresponding to the maximum absolute value coefficient. A minimum coefficient detector 71 receives the active tap number from the tap number calculator 76 and the tap coefficients outputted by the coefficient generators, and supplies the active tap number corresponding to the minimum absolute value coefficient through a multiplexer 87 and a distributor 79 to memories $70_1$ and $70_2$ and also directly to the coefficient clear circuit 77. The coefficient clear circuit 77 outputs the coefficient clear signal to a coefficient generator corresponding to the inputted tap number to clear the corresponding minimum absolute value coefficient to zero. The memories $70_1$ and $70_2$ store the inputted tap number at the end of a queue and transfers the tap number at the forefront of the queue to a selector 82.

When a predetermined number of coefficient update has been completed times, a counter 86 supplies a control signal to a switch 78 and also to a checking circuit 80. To the switch 78 constants $\mu_1$ and $\mu_2$ ($\mu_1 < \mu_2$) are supplied from a memory 83. The switch 78 is controlled by the counter 86. In its first state, it supplies $\mu_1$ as step size data to the coefficient generators $30_1$ to $30_L$. When it is brought to the second state by the control signal from the counter 86, it supplies $\mu_2$ as the step size data. The controlled tap range calculator 85 receives the tap number data $I_{max}$ corresponding to the maximum absolute value coefficient supplied from the maximum coefficient detector 81 and calculates ($I_{max}-L$) and ($I_{max}+L$), which are supplied to the checking circuit 80. The checking circuit 80 checks whether the tap number corresponding to the minimum absolute coefficient supplied from the minimum coefficient detector 71 through the multiplexer 87 is contained in the controlled tap range ($I_{max}\pm L$) supplied from the controlled tap range calculator 85 and generates the control signal. When the control signal supplied from the counter 86 represents the "first state" noted above, however, the checking circuit 80 unconditionally generates the control signal for selecting the memory $70_1$. Thus, all the inactive taps have been stored in the memory $70_1$ when the coefficient updating is started. The distributor 79 selects either one of the memories $70_1$ and $70_2$ according to the control signal from the checking circuit 80. Specifically, the distributor 87 selects the memory $70_1$ when the tap number supplied from the multiplexer 87 is in the controlled tap range while otherwise selecting the memory $70_2$, and transfers the tap number to the selected memory. The memory $70_1$ or $70_2$ selected by the distributor 79 stores the tap number supplied from the distributor 79.

The memories $70_1$ and $70_2$ have an FIFO (First-In-First-Out) structure, and cooperate to store (N–L) inactive tap numbers (N being the total number of taps, L being the number of active taps). The tap number calculator 76 calculates the tap number which is obtained by removing the inactive tap numbers stored in the memories $70_1$ and $70_2$ from the total tap numbers, i.e., the active tap numbers, and supplies these calculated tap numbers as tap switching control signals to the routing switch 7. The routing switch 7 selects the outputs of the delay elements corresponding to the L active tap numbers received from the tap number calculator 76 and transfers the selected outputs to the corresponding coefficient generators. The initial inactive tap numbers, i.e., the initial settings in the memory $70_1$, are selected such that the active tap numbers are uniformly spaced apart with respect to the total tap numbers. For example, when the total number of taps is N=13, the number of active taps is L=5, and the number of inactive taps is N–L=8, the total tap numbers are 1, 2, . . . , 13. In this case, the active tap numbers which are stored in the memory $70_1$ are initialized as 2, 3, 5, 6, 8, 9, 11 and 12 so that the active tap numbers are uniformly spaced apart as 1, 4, 7, 10 and 13. The inactive tap numbers may be stored in the memory $70_1$ in any order; for example, they may be stored in the ascending order, or they may be stored at random. After the above initialization has been completed, the coefficient update of the taps (i.e., active taps) selected by the routing switch 7 is made. Whenever Q (Q being a positive integer) coefficient update have been completed, the locations of the coefficients, i.e., the positions of the active taps, are updated.

In the "first state" noted above, the selector 82 selects the memory $70_1$ and discards the tap numbers taken out therefrom. In the "second state", the selector 82 switches, according to a control signal supplied from the controlled tap range calculator 85, two different states, i.e., one in which it selects the memory $70_1$ and discards the tap numbers taken out therefrom, and the other one in which it selects either memory $70_1$ or $70_2$ and supplies the tap numbers taken out therefrom to the multiplexer 87. The controlled tap range calculator 85 judges the variation of Imax supplied from the maximum coefficient detecting circuit 81 and generates the control signal supplied to the selector 82. When a change of $I_{max}$ is larger than a predetermined threshold value, the selector 82 generates, for a predetermined period of time, a control signal for feeding back tap numbers taken out from the memories $70_1$ and $70_2$ with alternate switching thereof to the multiplexer 87. When no variation of $I_{max}$ is detected, the selector 82 generates a control signal for selecting the memory $70_1$ and discard the tap numbers taken out therefrom. The variation of Imax can be judged by detecting that Imax is different from the preceding value continuously for a predetermined number of times. The tap numbers supplied from the selector 82 to the multiplexer 87, is fed back by the distributor 79 to the memory $70_1$ or $70_2$ in accordance with $I_{max}$ determined by the check circuit 80. In the above procedure, it is possible to shift the inactive tap numbers stored in the memories $70_1$ and $70_2$ to the other ones thereof when $I_{max}$ is varied.

It will be seen from the above that in the "first state", in which the coefficient update is completed a predetermined number of times, all the inactive taps are sequentially made effective, and in the subsequent "second state" after the completion only the taps of the tap numbers satisfying ($I_{max}\pm L$) are selectively made effective. According to the tap position control with the limitation of $I_{max}\pm L$, it is possible to realize quick convergence of tap-position control. In the "first state", stable coefficient growth with a small step size is realized, and the maximum coefficient detector 81 determines $I_{max}$ according to the accurate magnitude relationship of coefficient values obtained at the instant of the state transition to the "second state". Subsequently, the high speed convergence is attained with the usual step size.

In the prior art system as described above, when the input signal has a strong nonstationaricy such as a voice signal, the input signal samples supplied from the delay elements $20_1$ to $20_{N-1}$ to the coefficient generators $30_1$ to $30_L$ are greatly different in value. Particularly, the coefficient update in the coefficient generator which receives a smaller input signal sample than those supplied to other coefficient generators, is subject to greater errors, thus leading to erroneous coefficient values and also to erroneous tap control. In addition, when all the computation cannot be completed in one sampling period due to computation capacity restrictions on hardware, it is impossible to realize an adaptive filter with tap position control.

SUMMARY OF THE INVENTION

An object of the present invention is therefore to provide a method of and an apparatus for unknown system identification with an adaptive filter, which permits accurate tap position control with respect to input signal having a strong nonstationaricy irrespective of computation capacity restrictions on hardware.

According to a first aspect of the present invention, there is provided a method of unknown system identification with an adaptive filter, which stores the numbers of some of its taps with multiply and add operation coefficients used therefor as numbers of active taps, locates coefficients only in said active taps, stores the numbers of taps without any multiply and add operation coefficient used therefor as numbers of inactive taps in a queue and, whenever said coefficients corresponding to said active tap numbers have been updated a predetermined number of times, effects adaptive tap position control by active tap number update of storing one of said active tap numbers that corresponds to the coefficient having the minimum absolute value as an inactive tap number at the end of said queue and making the active tap number at the forefront of said queue to be an active tap number, said method comprising the steps of effecting coefficient update by using a first step size in a first state held from an adaptive operation start till completion of a predetermined number of times of active tap number update, effecting coefficient updating by using a second step size in a second state held after the completion of said predetermined number of times of active tap number update, providing, in said second step, said queue as two, i.e., a first and a second, queues, storing said minimum absolute value coefficient active tap number, when in the neighborhood of an active tap number corresponding to a coefficient judged to have the maximum absolute value, at the end of said first queue and otherwise at the end of said second queue, effecting selective storage type active tap number update of making the inactive tap number at the forefront of said first queue to be an active tap number, effecting the active tap number updating in said first state continuously a number of times equal to a predetermined first constant, effecting the active tap number update in said second state continuously a number of times equal to a predetermined second constant, and effecting, when the ratio of the input power supplied to said minimum absolute value coefficient tap to the total input power supplied to said active taps is less than a predetermined ratio, adaptive tap position control without counting the number of times of coefficient update executed as active tap number update in said first state.

According to a second aspect of the present invention, there is provided a method of unknown system identification with an adaptive filter, which stores the numbers of some of its taps with multiply and add operation coefficients used therefor as numbers of active taps, locates coefficients only in said active taps, stores the numbers of taps without any multiply and add operation coefficient used therefor as numbers of inactive taps in a queue and, whenever said coefficients corresponding to said active tap numbers have been updated a predetermined number of times, effects adaptive tap position control by active tap number update of storing one of said active tap numbers that corresponds to the coefficient having the minimum absolute value as an inactive tap number at the forefront of said queue to be an active tap number, said method comprising the steps of effecting coefficient update by using a first step size in a first step held until reaching of a predetermined unknown system output suppression value, effecting coefficient update by using a second step size in a second state held after said predetermined unknown system output suppression value, providing, in said second step, said queue as two, i.e., a first and a second, queues, storing said minimum absolute value coefficient active tap number, when in the neighborhood of an active tap number corresponding to a coefficient judged to have the maximum absolute value, at the end of said first queue and otherwise at the end of said second queue, effecting selective storage type active tap number update of making the inactive tap number at the forefront of said first queue to be an active tap number, effecting the active tap number update in said first state continuously a number of time equal to a predetermined first constant, effecting the active tap number update in said second state continuously a number of times equal to a predetermined second constant, and effecting adaptive tap position control by causing transition of said first state to said second state when said first state has been held for such a number of times of active tap number update that the input power supplied to said minimum absolute value coefficient tap is smaller than the total input power supplied to said active taps by at least a predetermined ratio.

A third aspect of the present invention features in that no coefficient update is effected when said total input power supplied to said active taps is less than a predetermined value.

A fourth aspect of the present invention features in that the active tap number corresponding to the maximum absolute coefficient value is not updated until reaching of a predetermined unknown system output suppression value.

A fifth aspect of the present invention features in that at least either the active tap number update or selective storage type active tap number update, no coefficient update is effected in a sampling period, in which active tap number update is made.

In the tap position control according to the present invention, when the total active tap power has a value less than a predetermined constant, the coefficient update is omitted according to the coefficient update omission signal generated by the input evaluating circuit.

In the tap position control according to the present invention, when the ratio between the total power of the input signals supplied to the active taps and the power of the input signal power to the minimum absolute value coefficient tap or the ratio between the total absolute voltage of the input signals supplied to the active taps and the absolute voltage of the input signal supplied to the minimum absolute value coefficient tap is greater than a predetermined constant, the counting of the counter is omitted according to the counter control signal generated by the input evaluating circuit.

In the tap position control according to the present invention, when the ratio between the total power of the input signals supplied to the active taps and the power of the input signal power to the minimum absolute value coefficient tap or the ratio between the total absolute voltage of the input signals supplied to the active taps and the absolute voltage of the input signal supplied to the minimum absolute value coefficient tap is greater than a predetermined constant, the timing of generation of a control signal for the state transition from the first state to the second state by the unknown system output suppression evaluating circuit, is delayed according to the unknown system output suppression evaluating circuit control signal generated by the input evaluating circuit.

In the tap position control according to the present invention, the unknown system output suppression amount is calculated according to the output of the unknown system and the error signal, and the maximum coefficient detector does not update the maximum absolute value coefficient active tap number until it receives a control signal, which is generated by the unknown system output suppression evaluating circuit when the system output suppression amount reaches to a predetermined value.

In the tap position control according to the present invention, the coefficient update omission signal is generated when the minimum coefficient detector obtains the small absolute value or squarecoefficient tap numbers.

According to other aspect of the present invention, there is provided an unknown system identification method with an adaptive filter of effective and inactive taps which effects an adaptive tap position control by active tap number update and effects coefficient update by using a first step size till completion of a predetermined number of times of active tap number update and by using a second step size in a second state held after the completion of said predetermined number of times of active tap number update, wherein the adaptive tap position control without counting the number of times of coefficient update is executed as active tap number update in the first state when the ratio of an input power supplied to the minimum absolute value coefficient tap to the total input power supplied to the active taps is less than a predetermined ratio.

According further aspect of the present invention, there is provided an unknown system identification apparatus based on an adaptive filter with active and inactive taps which performs an adaptive tap position control by active tap number update and having coefficient generating circuit, and performs coefficient update by using a first step size till completion of a predetermined number of times of active tap number update and by using a second step size in a second state held after the completion of said predetermined number of times of active tap number update, said apparatus further comprising: a first and a second memories; minimum coefficient detector for determining a tap number corresponding to the minimum absolute coefficient value; checking circuit for determining the memory corresponding to the supplied tap number and generates a first control signal; distributor for distributing tap numbers supplied to the memories corresponding to the first control signal through a multiplexer; selector for taking out and discarding the tap number from the first memory or feeding back the tap numbers taken out from the first and second memories by alternately selecting the same to the multiplexer; maximum coefficient detector for outputting the tap number corresponding to the maximum absolute coefficient value; controlled tap range calculator for generating a second control signal by calculating a controlled tap range corresponding to the tap number received from the maximum coefficient detector; input evaluating circuit for generating a third control signal for controlling a second switch by checking the magnitudes of input signals supplied to the active taps through a routing switch; counter for generating a coefficient update signal upon reaching of a predetermined number of times of coefficient update; a first switch for selectively supplying either one of two coefficient update step sizes to the coefficient generating circuit according to a coefficient update signal; and the second switch for supplying zero in lieu of the output of the first switch according to the third control signal.

Other objects and features of the present invention will be clarified from the following description with reference to attached drawings.

DETAILED DESCRIPTION OF PREFERRED EMBODIMENTS

Figure 1:
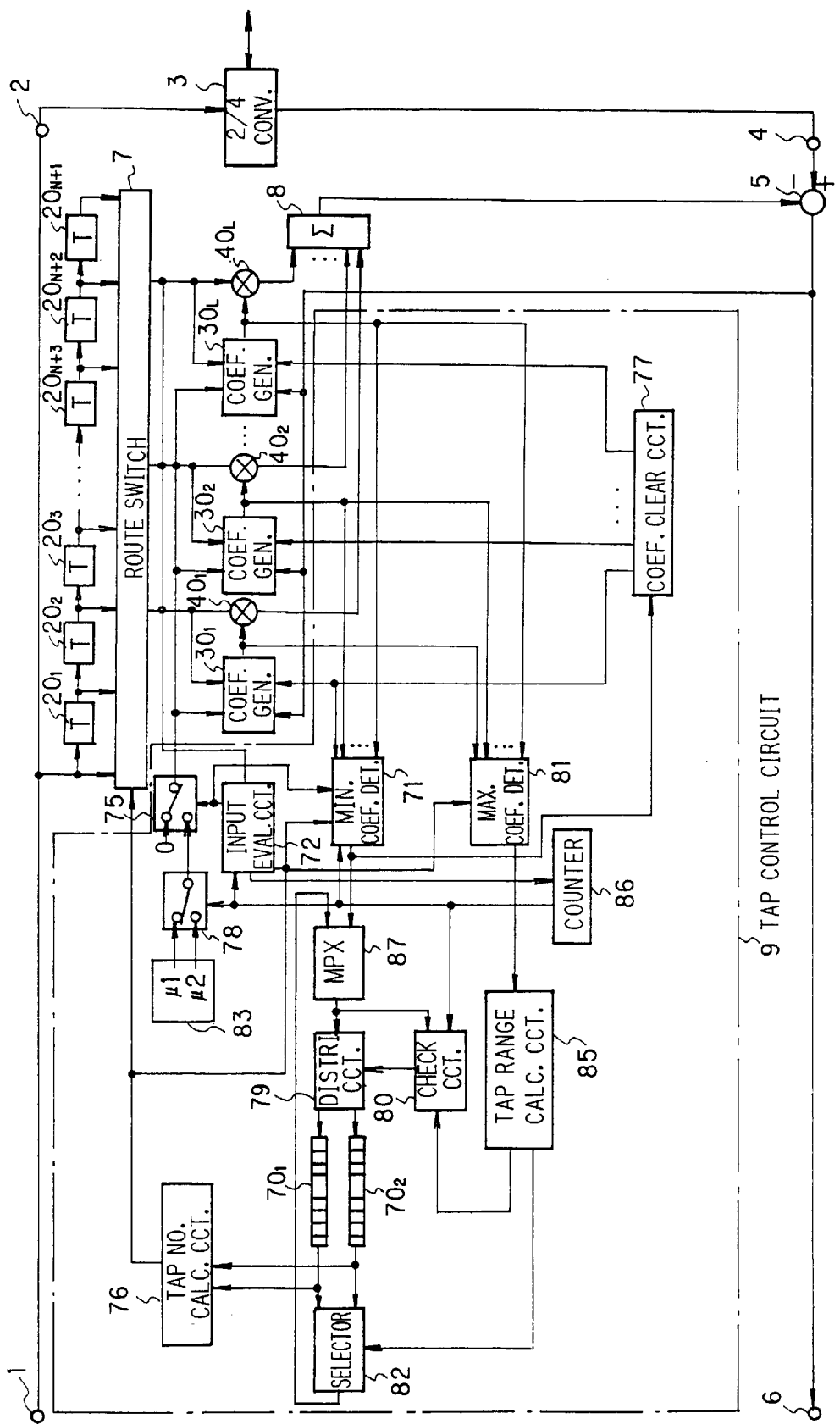
FIG. 1 is a block diagram showing a first embodiment of the present invention.

Embodiments of the present invention will now be described in detail with reference to the drawings. FIG. 1 is a block diagram showing a first embodiment of the present invention. The structure shown in FIG. 1 is the same as the prior art structure shown in FIG. 4 except for a maximum coefficient detector 83, an input evaluating circuit 72 and a switch 75. The operation will now be described mainly in connection with the minimum coefficient detector 82, the input evaluating circuit 72 and the switch 75.

The input evaluating circuit 72 obtains the total power of input signals supplied from the routing switch 7, and generates a coefficient update omission signal when the value of the total power obtained is less than a predetermined constant. The coefficient update omission signal is transmitted to the switch 75. The output of the switch 78 and zero are also supplied to the switch 75. When the coefficient update omission signal is supplied to it, the switch 75 selectively supplies zero to the coefficient generators $30_1$ to $30_L$. As a result, coefficient update is not effected in the coefficient generators $30_1$ to $30_L$. Unless the coefficient update omission signal is supplied, the switch 75 selectively supplies the output $\mu_1$ or $\mu_2$ of the switch 78 to the coefficient generators $30_1$ to $30_L$. The coefficient generators $30_1$ to $30_L$ thus effect coefficient update with a step size represented by $\mu_1$ or $\mu_2$ selected by the switch 78. When zero is selectively provided from the switch 75, the power of the input signal at each active tap is low. This can be regarded to be approximately zero input signal state, and the updated coefficient value is poorly reliable. To avoid this, the coefficient update is omitted by setting the switch 75 to the zero step size.

The input evaluating circuit 72 obtains the ratio between the total power of input signals from the routing switch 7 and the signal power supplied from the routing switch 7 to the coefficient generator generating the minimum absolute value coefficient, and generates a counter control signal for omitting the counting of the counter 86 when the ratio obtained is less than a predetermined constant. When it receives the counter control signal, the counter 86 interrupts the counting operation tentatively. With the tentative interruption of the counting operation, the timing of generation of the control signal from the counter 86, for causing transition from the "first state" to the "second state", is delayed, that is, the "first state" is prolonged. When the ratio between the total power of the input signals supplied from the routing switch 7 and the signal power supplied therefrom to the coefficient generator generating the minimum absolute value coefficient is greater than a predetermined constant, the input signal supplied to a certain specific active tap has a smaller amplitude compared to the input signals supplied to the other active taps, and the operation of making that specific active tap ineffective is poorly reliable. Correct $I_{max}$ can be determined by making up for the poor reliability and providing a longer "first state".

Figure 4:
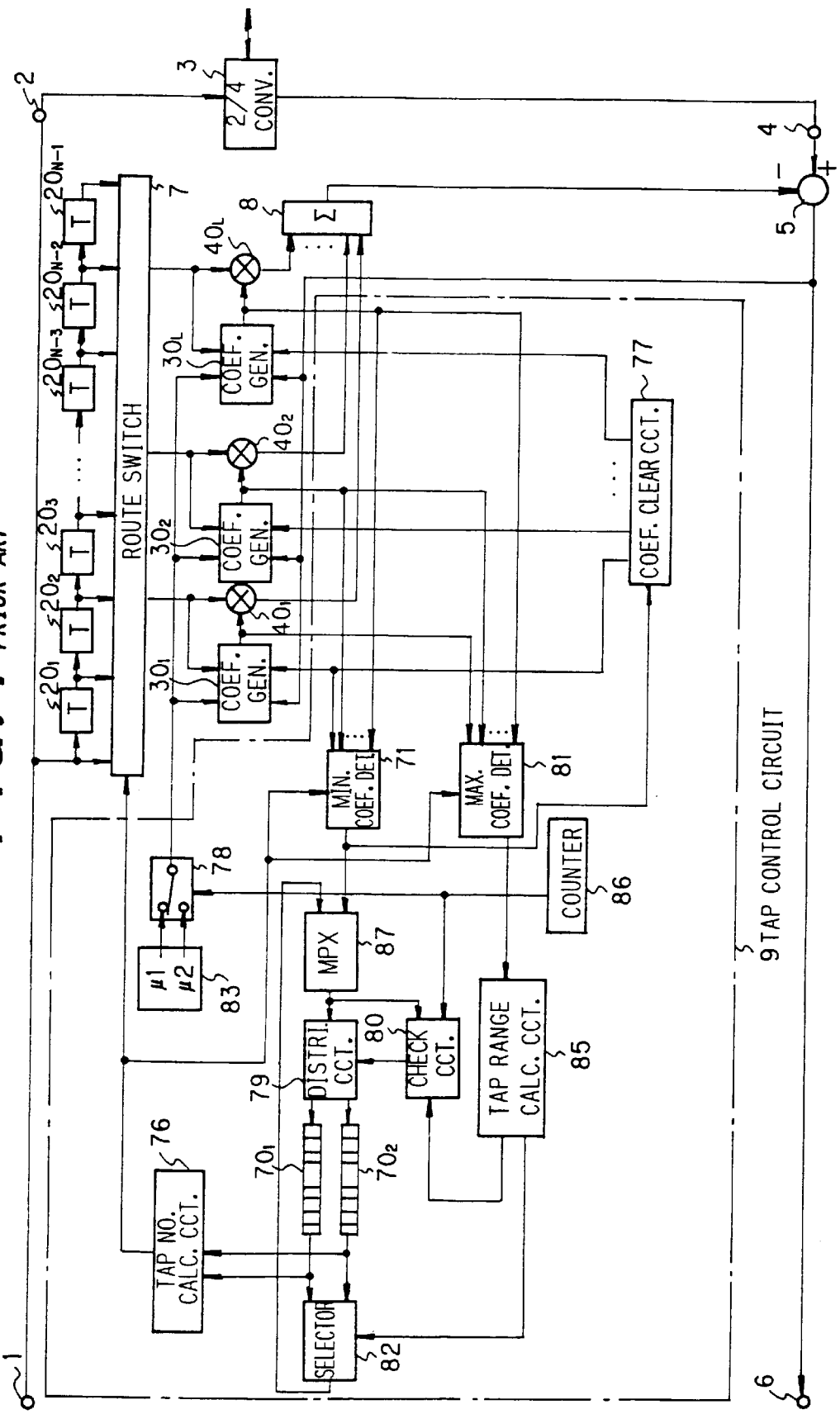
FIG. 4 is a block diagram showing the construction of the prior art echo canceler.
Figure 5:
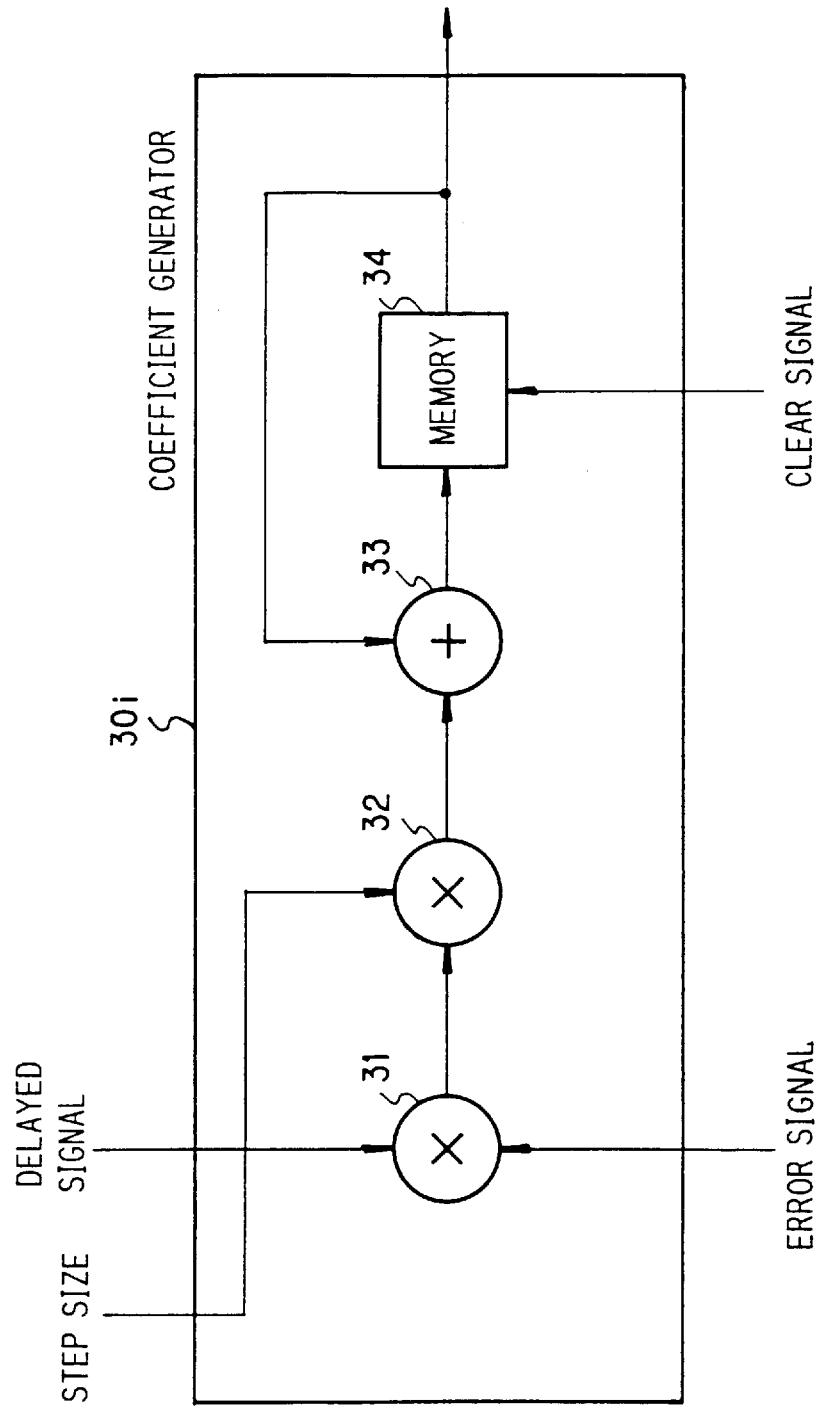
FIG. 5 is a block diagram showing a coefficient generator of FIG. 4.

The minimum coefficient detector 83 is different from the minimum coefficient detector 71 in the prior art structure shown in FIG. 4 in that it transmits the coefficient update omission signal to the switch 75 while the minimum value detection is in force. When the coefficient update omission signal is supplied from the switch 75, the switch 75 selectively supplies zero to the coefficient generators $30_1$ to $30_L$. Thus, while the minimum coefficient detector 83 is actually in the minimum value detection, coefficient update is not effected in the coefficient generators $30_1$ to $30_L$.

Figure 2:
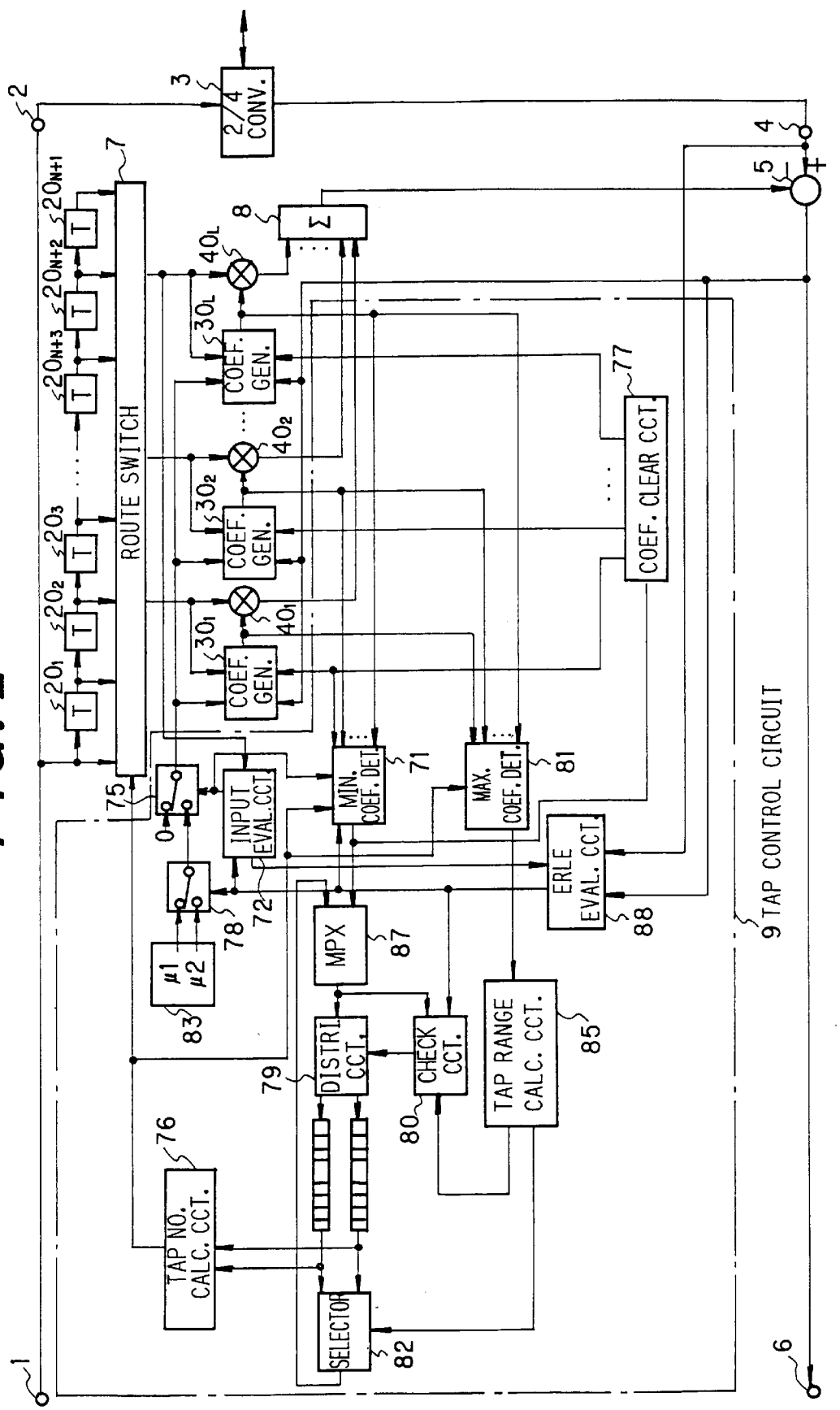
FIG. 2 is a block diagram showing a second embodiment of the present invention.

FIG. 2 is a block diagram showing a second embodiment of the present invention. This embodiment is different from the preceding first embodiment in that an echo suppression (ERLE) evaluating circuit 88 is provided in lieu of the counter 86 shown in FIG. 2. The ERLE evaluating circuit 88 calculates ERLE by dividing echo supplied from the reception signal input terminal 4 by the error signal (or residual echo) obtained as the output of the subtractor 5. It generates a control signal like that from the counter 86 by comparing the calculated ERLE and a predetermined value. However, since the ERLE is subject to increase, it is set that when the control signal supplied from the counter 86 indicates that a predetermined number of times of coefficient update have not yet been completed since the start thereof, the unknown system output suppression value is less than a predetermined value.

Figure 3:
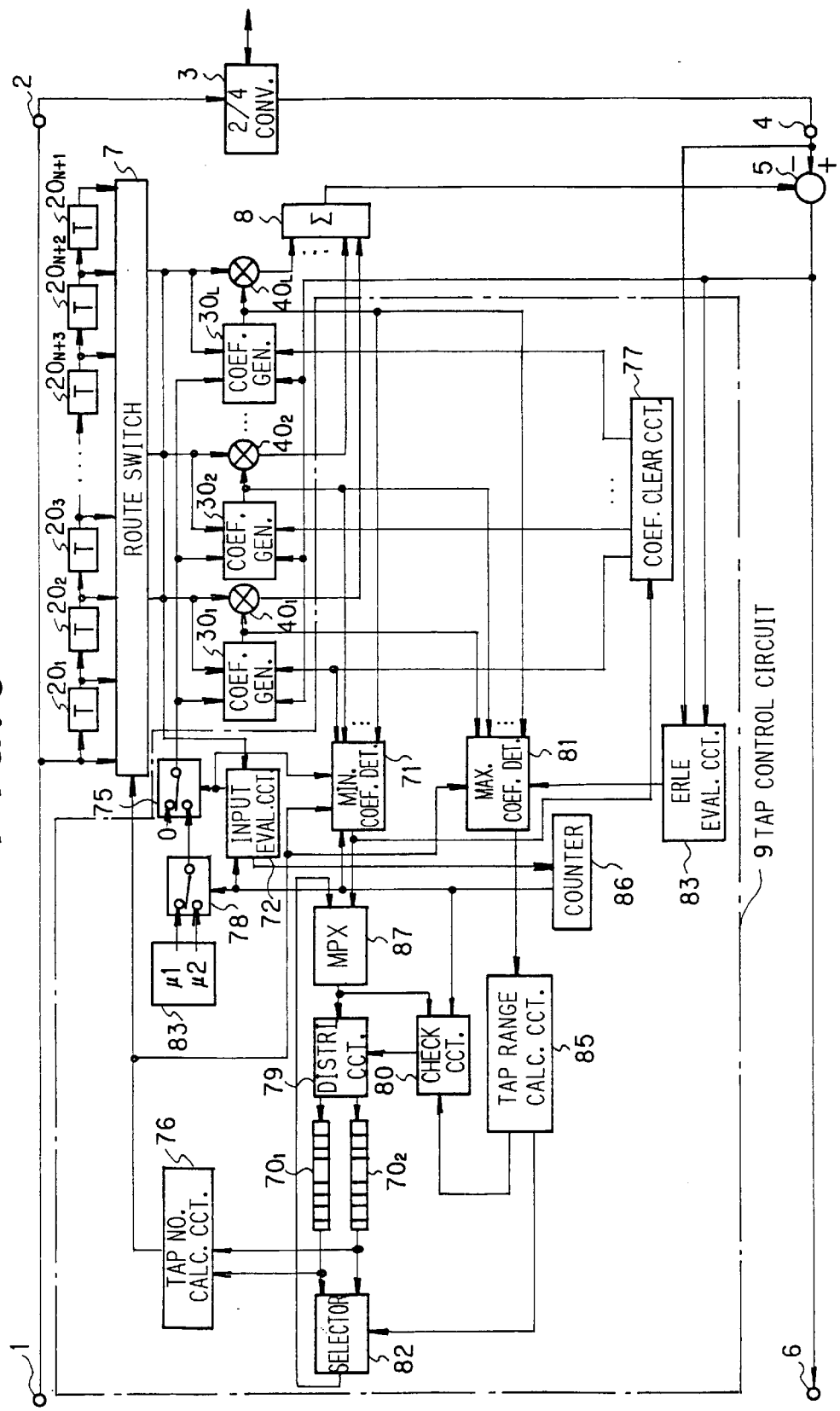
FIG. 3 is a block diagram showing a third embodiment of the present invention.

FIG. 3 is a block diagram showing a third embodiment of the present invention. This embodiment is different from the previous first embodiment an echo suppression (ERLE) evaluating circuit 88 is additionally provided, which calculates ERLE by dividing the echo supplied from the reception signal input terminal 4 by the error signal (residual echo) obtained as the output of the subtractor 5. The ERLE evaluating circuit 88 generates a control signal for controlling the maximum coefficient detector 81 by comparing the obtained ERLE and a predetermined value. Since ERLE is increased with time and is saturated upon reaching of a certain value, the ERLE evaluating circuit 88 generates a control signal supplied to the maximum coefficient evaluating circuit 88 when the unknown system output suppression value exceeds a predetermined value. In the "second state", the maximum coefficient detector 81 does not update the active tap number corresponding to the maximum absolute value coefficient that is outputted until it receives the control signal from the ERLE evaluating circuit 88. With the function of the ERLE evaluating circuit 88, the update of the active tap number corresponding to the maximum absolute value coefficient is evaded in an initial stage of filter coefficient converging until ERLE is sufficiently increased. Thus, stable coefficient converging and tap position control can be realized.

In the above embodiments shown in FIGS. 1 to 3 the minimum and maximum coefficient detectors 83 and 81 obtained and outputted the active tap number corresponding to the maximum absolute value coefficient. However, the magnitude relation of the coefficient values is not changed by using the squares of coefficients in lieu of the absolute values thereof. That is, the minimum and maximum coefficient detectors 83 and 81 may detect the squared values of the maximum and minimum coefficients in lieu of the absolute values thereof.

In the above embodiments shown in FIGS. 1 to 3 the input evaluating circuit 72 generated the coefficient update omission signal and the counter control signal according to the input signal power. However, it is possible to use the input signal amplitude in lieu of the input signal power without alteration of the principles underlying the generation of the coefficient update omission signal and the counter control signal.

While the above embodiments concerned with the echo cancelers, the present invention is also applicable to noise cancelers, hauling cancelers, adaptive equalizers and so forth under the same principles.

As has been described in the foregoing, according to the present invention it is possible to obtain accurate tap position control with respect to an input signal having a strong nonstationaricy irrespective of computation restrictions on hardware. Namely, the tap position control is effected accurately with respect to even input signals having strong nonstationaricy irrespective of computational restrictions on hardware, thus attaining convergence time reduction and residual error reduction.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A method of unknown system identification with an adaptive filter, which stores the numbers of some of its taps with multiply and add operation coefficients used therefor as numbers of active taps, locates coefficients only in said active taps, stores the numbers of taps without any multiply and add operation coefficient used therefor as numbers of inactive taps in a queue and, whenever said coefficients corresponding to said active tap numbers have been updated a predetermined number of times, effects adaptive tap position control by active tap number update of storing one of said active tap numbers that corresponds to the coefficient having the minimum absolute value as an inactive tap number at the end of said queue and making the active tap number at the forefront of said queue to be an active tap number, said method comprising the steps of effecting coefficient update by using a first step size in a first state held from an adaptive operation start till completion of a predetermined number of times of active tap number update, effecting coefficient update by using a second step size in a second state held after the completion of said predetermined number of times of active tap number update, providing, in said second step, said queue as first and second, queues, storing said minimum absolute value coefficient active tap number, when in the neighborhood of an active tap number corresponding to a coefficient judged to have the maximum absolute value, at the end of said first queue and otherwise at the end of said second queue, effecting selective storage type active tap number update of making the inactive tap number at the forefront of said first queue to be an active tap number, effecting the active tap number update in said first state continuously a number of times equal to a predetermined first constant, effecting the active tap number update in said second state continuously a number of times equal to a predetermined second constant, and effecting, when the ratio of the input power supplied to said minimum absolute value coefficient tap to the total input power supplied to said active taps is less than a predetermined ratio, adaptive tap position control without counting the number of times of coefficient update executed as active tap number update in said first state.

2. A method of unknown system identification with an adaptive filter, which stores the numbers of some of its taps with multiply and add operation coefficients used therefor as numbers of active taps, locates coefficients only in said active taps, stores the numbers of taps without any multiply and add operation coefficient used therefor as numbers of inactive taps in a queue and, whenever said coefficients corresponding to said active tap numbers have been updated a predetermined number of times, effects adaptive tap position control by active tap number update of storing one of said active tap numbers that corresponds to the coefficient having the minimum absolute value as an inactive tap number at the forefront of said queue to be an active tap number, said method comprising the steps of effecting coefficient update by using a first step size in a first step held until reaching of a predetermined unknown system output suppression value, effecting coefficient update by using a second step size in a second state held after said predetermined unknown system output suppression value, providing, in said second step, said queue as first and second, queues, storing said minimum absolute value coefficient active tap number, when in the neighborhood of an active tap number corresponding to a coefficient judged to have the maximum absolute value, at the end of said first queue and otherwise at the end of said second queue, effecting selective storage type active tap number update of making the inactive tap number at the forefront of said first queue to be an active tap number, effecting the active tap number update in said first state continuously a number of time equal to a predetermined first constant, effecting the active tap number update in said second state continuously a number of times equal to a predetermined second constant, and effecting adaptive tap position control by causing transition of said first state to said second state when said first state has been held for such a number of times of active tap number update that the input power supplied to said minimum absolute value coefficient tap is smaller than the total input power supplied to said active taps by at least a predetermined ratio.

3. A method of unknown system identification with an adaptive filter according to one of claims 1 and 2, wherein no coefficient update is effected when said total input power supplied to said active taps is less than a predetermined value.

4. A method of unknown system identification with an adaptive filter according to one of claims 1 and 2, wherein the active tap number corresponding to the maximum absolute value coefficient value is not updated until reaching of a predetermined unknown system output suppression value.

5. A method of unknown system identification with an adaptive filter according to one of claims 1 and 2, wherein the squares of coefficients are used in lieu of the absolute value coefficients.

6. A method of unknown system identification with an adaptive filter according to one of claims 1 and 2, wherein in at least either said active tap number update or selective storage type active tap number update, no coefficient update is effected in a sampling period, in which active tap number update is effected.

7. A method of unknown system identification with an adaptive filter according to claim 3, wherein the active tap number corresponding to the maximum absolute value coefficient value is not updated until reaching of a predetermined unknown system output suppression value.

8. A method of unknown system identification with an adaptive filter according to claim 3, wherein the squares of coefficients are used in lieu of the absolute value coefficients.

9. A method of unknown system identification with an adaptive filter according to claim 3, wherein in at least either said active tap number update or selective storage type active tap number update, no coefficient update is effected in a sampling period, in which active tap number update is effected.

10. A method of unknown system identification with an adaptive filter according to claim 4, wherein the squares of coefficients are used in lieu of the absolute value coefficients.

11. A method of unknown system identification with an adaptive filter according to claim 4, wherein in at least either said active tap number update or selective storage type active tap number update, no coefficient update is effected in a sampling period, in which active tap number update is effected.

12. A method of unknown system identification with an adaptive filter according to claim 5, wherein in at least either said active tap number update or selective storage type active tap number update, no coefficient update is effected in a sampling period, in which active tap number update is effected.

13. An apparatus for unknown system identification with an adaptive filter, which effects coefficient update by using an error signal obtained by the subtraction of an identification signal outputted by it from the output of an unknown system, said apparatus comprising a plurality of delay elements in cascade connection for providing a delay to an input signal to said unknown system, a routing switch for selectively outputting some of delay signals as the outputs of said plurality of delay elements, a plurality of coefficient generators for generating tap coefficient values by receiving the output signals of said routing switch, an error signal and a coefficient clear signal, multipliers for multiplying said tap coefficient values outputted from said coefficient generators and said output signals of said routing switch by one another, respectively, an adder for outputting an identification signal by adding together the outputs of said multipliers, a subtractor for obtaining said error signal by subtracting said identification signal from said output of said unknown system, and a tap controller for generating a control signal for controlling said routing switch and said coefficient clear signal by receiving said coefficient values outputted from said coefficient generators, said coefficient generators each including a first multiplier for multiplying the delay signal from the associated delay element and said error signal by each other, a second multiplier for multiplying the output of said first multiplier and a predetermined constant by each other, an adder for adding together the output of said second multiplier and a feedback signal, and a memory for storing the output of said adder as said coefficient value and also feeding back said adder output as said feedback signal to said adder, the content in said memory being reset to zero by said coefficient clear signal, said tap controller including a counter for counting times of coefficient update except for a case when specified otherwise by a counter control signal from the commencement of adaptive operation and, after a predetermined count has been obtained, outputting a control signal for causing a state transition from a first state of control to a second state thereof, a first memory for storing inactive tap numbers in the vicinity of the active tap number judged to correspond to the maximum absolute value coefficient, a second memory for storing inactive tap numbers not in said vicinity, a judging circuit for receiving the outputs of said first and second memories and outputting either one of said memory outputs that meets a predetermined judging condition, while discarding the other memory output, a tap number calculator for calculating the other tap numbers than the tap number held in said first and second memories and outputting the calculated tap numbers to said routing switch, a minimum coefficient detector for obtaining, in said first state of control, small absolute value coefficient tap numbers corresponding in number to a first constant and obtaining, in said second state of control, small absolute value coefficient tap numbers corresponding in number to a second constant by receiving said tap numbers outputted from said tap number calculator, and said counter output control signal, an input evaluating circuit for generating a coefficient update omission signal when the total power of said output signals from said routing switch has a value less than a predetermined third constant and generating a counter control signal when the ratio between said total routing switch output signal power and the power supplied from said routing switch to the coefficient generator generating the minimum absolute value coefficient is greater than a predetermined fourth constant, a multiplexer for multiplexing the tap number obtained in said minimum coefficient detector, a checking circuit for checking, according to said judging condition and said counter output control signal, as to whether a tap number supplied from said multiplexer is in said vicinity, a distributor for distributing the tap number supplied from said multiplexer to said first and second memories according to the result of check in said checking circuit, a coefficient clear circuit for supplying said coefficient clear circuit to the coefficient generator corresponding to the tap number outputted from said minimum coefficient detector, a maximum coefficient detector for outputting an active tap number corresponding to the maximum absolute value coefficient by receiving said tap numbers outputted from said tap number calculating circuit and said coefficient values outputted from said plurality of coefficient generators, a controlled tap range calculator for specifically calculating said vicinity by using the active tap number received from said maximum coefficient detector and a predetermined constant, a first switch for receiving a first step size and a second step size from a third memory and switching said first step size over to said second step size for outputting according to said counter output control signal, and a second switch for receiving the output of said first switch and zero and transferring said first switch output normally, and zero when specified by said coefficient update omission signal supplied from said input evaluating circuit, to said coefficient generators.

14. An apparatus for unknown system identification with an adaptive filter according to claim 13, which further comprises an unknown system output suppression evaluating circuit for calculating unknown system output suppression by receiving said unknown system output and said error signal and generating a control signal upon reaching of a predetermined value by said calculated system output suppression, said maximum coefficient detector, which outputs an active tap number corresponding to the maximum absolute value by receiving said tap numbers outputted from said tap number calculating circuit and said coefficient values outputted from said tap number calculating circuit and said coefficient values outputted from said plurality of coefficient generators, being such that it does not update the maximum absolute value coefficient active tap number until it receives said control signal from said unknown system output suppression evaluating circuit.

15. An apparatus for unknown system identification with an adaptive filter, which effects coefficient update by using an error signal obtained by the subtraction of an identification signal outputted by it from the output of an unknown system, said apparatus comprising a plurality of delay elements in cascade connection for providing a delay to an input signal to said unknown system, a routing switch for selectively outputting some of delay signals as the outputs of said plurality of delay elements, a plurality of coefficient generators for generating tap coefficient values by receiving the output signals of said routing switch, an error signal and a coefficient clear signal, multipliers for multiplying said tap coefficient values outputted from said coefficient generators and said output signals of said routing switch by one another, respectively, an adder for outputting an identification signal by adding together the outputs of said multipliers, a subtractor for obtaining said error signal by subtracting said identification signal from said output of said unknown system, and a tap controller for generating a control signal for controlling said routing switch and said coefficient clear signal by receiving said coefficient values outputted from said coefficient generators, said coefficient generators each including a first multiplier for multiplying the delay signal from the associated delay element and said error signal by each other, a second multiplier for multiplying the output of said first multiplier and a predetermined constant by each other, an adder for adding together the output of said second multiplier and a feedback signal, and a memory for storing the output of said adder as said coefficient value and also feeding back said adder output as said feedback signal to said adder, the content in said memory being reset to zero by said coefficient clear signal, said tap controller including an unknown system output suppression evaluating circuit for counting times of coefficient update from the commencement of adaptive operation until reaching of a count specified by an unknown system output suppression evaluating circuit control signal, calculating the unknown system output suppression by receiving said unknown system output and said error signal, and outputting a control signal for causing transition of the control state from said first state to said second state after a delay of times of coefficient update corresponding in number to said specified count from the instant of reaching of a predetermined value of unknown system output suppression, a first memory for storing an inactive tap number in the vicinity of the active tap number judged to correspond to the maximum absolute value coefficient, a judging circuit for receiving the outputs of said first and second memories and outputting either one of said memory outputs that meets a predetermined judging condition, while discarding the other memory output, a tap number calculator for calculating the other tap numbers than the tap number held in said first and second memories and outputting the calculated tap numbers to said routing switch, a minimum coefficient detector for obtaining, in said first state of control, small absolute value coefficient tap numbers corresponding in number to a first constant and obtaining, in said second state of control, small absolute value coefficient tap numbers corresponding in number to a second constant by receiving said tap numbers outputted from said tap number calculator, and said counter output control signal, an input evaluating circuit for generating a coefficient of update omission signal when the total number of said output signals from said remote switch has a value less than a predetermined third constant and generating a constant control signal when the ratio between said total routing switch output signal power and the power supplied from said routing switch to the coefficient generator generating the minimum absolute value coefficient is greater than a predetermined fourth constant, a multiplexer for multiplexing the tap number obtained in said minimum coefficient detector, a checking circuit for checking, according to said judging condition and said counter output control signal, as to whether a tap number supplied from said multiplexer is in said vicinity, a distributor for distributing the tap number supplied from said multiplexer to said first and second memories according to the result of check in said checking circuit, a coefficient clear circuit for supplying said coefficient clear circuit to the coefficient generator corresponding to the tap number outputted from said minimum coefficient detector, a maximum coefficient detector for outputting the active tap number corresponding to the maximum absolute value coefficient by receiving said tap numbers outputted from said tap number calculating circuit and said coefficient values outputted from said plurality of coefficient generators, a controlled tap range calculator for specifically calculating said vicinity by using the active tap number received from said maximum coefficient detector and a predetermined constant, a first switch for effecting a first step size and a second step size from a third memory and switching said first step size over to said second step size for outputting according to said counter Output control signal, and a second switch for receiving the output of said first switch and zero and transferring said first switch output normally, and zero when specified by said coefficient update omission signal supplied from said input evaluating circuit, to said coefficient generators.

16. An apparatus for unknown system identification with an adaptive filter according to one of claims 13 to 15, wherein said first memory stores inactive tap numbers in the vicinity of the active tap number judged to correspond to the maximum square coefficient, said minimum coefficient detector obtains, in said first state of control, small square coefficient tap numbers corresponding in number to a first constant, obtains, in a second state of control, small square coefficient tap numbers corresponding in number to said second constant, generates said coefficient update omission signal when the sum of the squares of said coefficient values is less than a predetermined third constant, and generates said unknown system output suppression evaluating circuit control signal when the ratio between said coefficient square sum and the minimum coefficient square is greater than a predetermined fourth constant, and said maximum coefficient detector outputs the maximum square coefficient active tap number.

17. An apparatus for unknown system identification with an adaptive filter according to one of claims 13 to 14, wherein said coefficient update omission signal is also generated and supplied to said second switch when said minimum coefficient detector obtains tap numbers corresponding to small absolute values or squares.

18. An apparatus for unknown system identification with an adaptive filter according to claim 16, wherein said coefficient update omission signal is also generated and supplied to said second switch when said minimum coefficient detector obtains tap numbers corresponding to small absolute values or squares.

19. A method of unknown system identification with an adaptive filter of effective and inactive taps which effects an adaptive tap position control by active tap number update and effects coefficient update by using a first step size in a first state till completion of a predetermined number of times of active tap number update and by using a second step size in a second state held after the completion of said predetermined number of times of active tap number update, wherein the adaptive tap position control without counting the number of times of coefficient update is executed as active tap number update in the first state when the ratio of an input power supplied to the minimum absolute value coefficient tap to the total input power supplied to the active taps is less than a predetermined ratio.

20. An unknown system identification based on an adaptive filter with effective and inactive taps which performs an adaptive tap position control by active tap number update and having coefficient generating circuit, and performs coefficient update by using a first step size till completion of a predetermined number of times of active tap number update and by using a second step size in a second state held after the completion of said predetermined number of times of active tap number update, said apparatus further comprising:

a first and a second memories;

minimum coefficient detector for determining a tap number corresponding to the minimum absolute coefficient value;

checking circuit for determining the memory corresponding to the supplied tap number and generates a first control signal;

distributor for distributing tap numbers supplied to the memories corresponding to the first control signal through a multiplexer;

selector for taking out and discarding the tap number from the first memory or feeding back the tap numbers taken out from the first and second memories by alternately selecting the same to the multiplexer;

maximum coefficient detector for outputting the tap number corresponding to the maximum absolute coefficient value;

controlled tap range calculator for generating a second control signal by calculating a controlled tap range corresponding to the tap number received from the maximum coefficient detector;

input evaluating circuit for generating a third control signal for controlling a second switch by checking the magnitudes of input signals supplied to the active taps through a routing switch;

counter for generating a coefficient update signal upon reaching of a predetermined number of times of coefficient update;

a first switch for selectively supplying either one of two coefficient update step sizes to the coefficient generating circuit according to a coefficient update signal; and the second switch for supplying zero in lieu of the output of the first switch according to the third control signal.

* * * * *